(12) United States Patent
High et al.

(10) Patent No.: US 12,080,179 B2
(45) Date of Patent: *Sep. 3, 2024

(54) SYSTEMS AND METHODS TO ALLOCATE UNMANNED AIRCRAFT SYSTEMS

(71) Applicant: Walmart Apollo, LLC, Bentonville, AR (US)

(72) Inventors: Donald R. High, Noel, MO (US); Robert C. Taylor, Round Rock, TX (US); David C. Winkle, Leesburg, FL (US); John P. Thompson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,419

(22) Filed: Jul. 14, 2023

(65) Prior Publication Data

US 2023/0360542 A1 Nov. 9, 2023

Related U.S. Application Data

(63) Continuation of application No. 17/372,853, filed on Jul. 12, 2021, now abandoned, which is a
(Continued)

(51) Int. Cl.
*G08G 5/00* (2006.01)
*B64C 39/02* (2023.01)
(Continued)

(52) U.S. Cl.
CPC ......... *G08G 5/0043* (2013.01); *B64C 39/024* (2013.01); *G06F 16/22* (2019.01);
(Continued)

(58) Field of Classification Search
CPC .............. B64C 39/024; B64U 2101/00; B64U 2201/00; B64U 2101/30; B64U 2101/64;
(Continued)

(56) References Cited

U.S. PATENT DOCUMENTS 9,053,588 B1 6/2015 Briggs
9,412,278 B1 8/2016 Gong
(Continued)

OTHER PUBLICATIONS

Book a Drone; "Book a Drone Provides you with Qualified Drone Operators"; http://bookadrone.co.uk/; Retrieved on Dec. 18, 2015; 1 page.
(Continued)

*Primary Examiner* — Calvin Cheung
(74) *Attorney, Agent, or Firm* — Fitch, Even, Tabin & Flannery LLP (57) ABSTRACT

In some embodiments, apparatuses and methods are provided herein useful to allocate unmanned aircraft system (UAS). Some embodiments, provide UAS allocation systems, comprising: a UAS database that stores for each registered UAS an identifier and corresponding operational capabilities; an allocation control circuit configured to: obtain a first set of multiple task parameters specified by a first customer and corresponding to a requested first predefined task that the customer is requesting a UAS be allocated to perform; identify, from the UAS database, a first UAS having operational capabilities to perform the first set of task parameters while implementing the first task; and cause an allocation notification to be communicated to a first UAS provider, of the multiple UAS providers, associated with the first UAS requesting the first UAS provider to allocate the identified first UAS to implement the first task.

20 Claims, 2 Drawing Sheets

Related U.S. Application Data continuation of application No. 16/265,129, filed on Feb. 1, 2019, now Pat. No. 11,062,612, which is a continuation of application No. 15/427,260, filed on Feb. 8, 2017, now Pat. No. 10,229,605.

(60) Provisional application No. 62/294,806, filed on Feb. 12, 2016.

(51) Int. Cl.
| | |
|---|---|
| G06F 16/22 | (2019.01) |
| G06Q 10/06 | (2023.01) |
| G06Q 50/40 | (2024.01) |
| B64U 101/00 | (2023.01) |

(52) U.S. Cl.
CPC .............. *G06Q 10/06* (2013.01); *G06Q 50/40* (2024.01); *G08G 5/0004* (2013.01); *G08G 5/0013* (2013.01); *G08G 5/0017* (2013.01); *G08G 5/0026* (2013.01); *G08G 5/0069* (2013.01); *B64U 2101/00* (2023.01); *B64U 2201/00* (2023.01)

(58) Field of Classification Search
CPC ........ G06F 16/22; G06Q 10/06; G06Q 50/40; G06Q 10/0631; G06Q 10/0834; G08G 5/0043; G08G 5/0004; G08G 5/0013; G08G 5/0017; G08G 5/0026; G08G 5/0069

See application file for complete search history.

(56) References Cited

U.S. PATENT DOCUMENTS

| | | | |
|---|---|---|---|
| 9,573,684 B2 | 2/2017 | Kimchi | |
| 9,734,723 B1 | 8/2017 | Bruno | |
| 9,928,749 B2 | 3/2018 | Gil | |
| 10,229,605 B2 | 3/2019 | High | |
| 11,062,612 B2 | 7/2021 | High | |
| 2001/0037174 A1 | 11/2001 | Dickerson | |
| 2007/0021880 A1 | 1/2007 | Appleby | |
| 2009/0073034 A1 | 3/2009 | Lin | |
| 2010/0312917 A1 | 12/2010 | Allport | |
| 2013/0054280 A1 | 2/2013 | Moshfeghi | |
| 2014/0032107 A1 | 1/2014 | Courteville | |
| 2014/0074339 A1 | 3/2014 | Casado | |
| 2014/0172727 A1 | 6/2014 | Abhyanker | |
| 2014/0222248 A1 | 8/2014 | Levien | |
| 2015/0158587 A1 | 6/2015 | Patrick | |
| 2015/0323930 A1 | 11/2015 | Downey | |
| 2015/0336668 A1 | 11/2015 | Pasko | |
| 2015/0379874 A1 | 12/2015 | Ubhi | |
| 2016/0111006 A1 | 4/2016 | Srivastava | |
| 2016/0247404 A1 | 8/2016 | Srivastava | |
| 2016/0307449 A1 | 10/2016 | Gordon | |
| 2017/0131727 A1 | 5/2017 | Kurdi | |
| 2017/0169713 A1 | 6/2017 | Gong | |
| 2017/0170972 A1 | 6/2017 | Wu | |
| 2017/0286892 A1 | 10/2017 | Studnicka | |
| 2017/0372617 A1 | 12/2017 | Bruno | |
| 2018/0016027 A1 | 1/2018 | Cheatham, III | |
| 2018/0025044 A1* | 1/2018 | Hostetter | G08G 5/0043 707/690 |
| 2018/0114174 A1 | 4/2018 | Boland | |
| 2018/0253092 A1 | 9/2018 | Trapero Esteban | |
| 2021/0343166 A1 | 11/2021 | High | |

OTHER PUBLICATIONS

CNIPA; App. No. 201780023366.2; Office Action mailed May 31, 2021.

Drone Hire; https://dronehireservices.com/; Retrieved on Dec. 18, 2015; 1 page.

drone-registration.net; "FAA Drone Registration"; https://drone-registration.net/faa-register-drone/; Retrieved on Jun. 14, 2018; pp. 1-2.

Federal Drone Registration, LLC.; "Federal Drone Registration FAQ"; https://federaldroneregistration.com/faq/; Retrived Oct. 16, 2018; pp. 1-11.

Gofor; "Drones on Demand: Behind the Scenes at Gofor"; Retrieved on Dec. 18, 2015; http://www.gofordrones.com/about/; 11 pages.

PCT; App. No. PCT/US2017/016957; International Search Report and Written Opinion mailed Apr. 14, 2017.

U.S. Appl. No. 15/427,260; Notice of Allowance mailed Oct. 25, 2018.

U.S. Appl. No. 15/427,260; Office Action mailed Jun. 15, 2018.

U.S Appl. No. 16/265,129; Notice of Allowance mailed Mar. 8, 2021.

U.S Appl. No. 16/265,129; Office Action mailed Dec. 1, 2020.

U.S. Appl. No. 17/372,853; Non-Final Rejection mailed Jan. 11, 2023.

U.S. Appl. No. 17/372,853; Notice of Allowance and Fees Due (PTOL-85) mailed Apr. 17, 2023; (pp. 1-7).

* cited by examiner

SYSTEMS AND METHODS TO ALLOCATE UNMANNED AIRCRAFT SYSTEMS

CROSS-REFERENCE TO RELATED APPLICATION

This application is a continuation of U.S. application Ser. No. 17/372,853, filed Jul. 12, 2021, which is a continuation of U.S. application Ser. No. 16/265,129, filed Feb. 1, 2019, now U.S. Pat. No. 11,062,612, which is a continuation of U.S. application Ser. No. 15/427,260, filed Feb. 8, 2017, now U.S. Pat. No. 10,229,605, which claims the benefit of U.S. Provisional Application No. 62/294,806, filed Feb. 12, 2016, all of which are incorporated herein by reference in their entirety.

TECHNICAL FIELD

This invention relates generally to unmanned aircraft systems.

BACKGROUND

The use of unmanned aircraft systems (UAS) has been increasing over the last several years. This includes both commercial and recreational uses. Accordingly, there is a large number of UASs that are in use. The different uses of UASs has similarly been increasing. Further, it is expected that the number of uses of UASs will continue to increase.

BRIEF DESCRIPTION OF THE DRAWINGS

Disclosed herein are embodiments of systems, apparatuses and methods pertaining to allocating unmanned aircraft systems (UAS). This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided to enable the allocation of unmanned aircraft systems (UAS) that have capabilities to perform one or more tasks requested by a customer. In some embodiments an UAS allocation system includes a UAS database identifying multiple registered different UASs that are owned and operated by multiple different UAS providers. Typically, the multiple UAS providers are separate and unassociated entities. Further, these different UAS providers typically operate independent of each other and have agreed to allow other entities to make use of their UASs independent of UASs of other UAS providers. The UAS database stores, for each of the registered different UASs, an identifier and corresponding operational capabilities of the UAS. The multiple registered different UASs have different operational capabilities. The UAS allocation system further includes an allocation control circuit that is communicatively coupled with the UAS database, and obtains from each customer request a set of multiple task parameters specified by each customer that correspond to a requested predefined task that the customer is requesting a UAS be allocated to perform. For each request, the allocation control circuit, using one or more of the set of task parameters, can identify, from the UAS database, one or more UASs having operational capabilities to perform the set of task parameters while implementing the task. Based on the identification, a UAS provider associated with one or more of the identified UASs that can perform the set of task parameters is selected, and the allocation control circuit can cause an allocation notification to be communicated to at least one of the selected UAS providers associated with the UASs requesting the UAS provider allocate the identified UAS to implement the first task.

Figure 1:
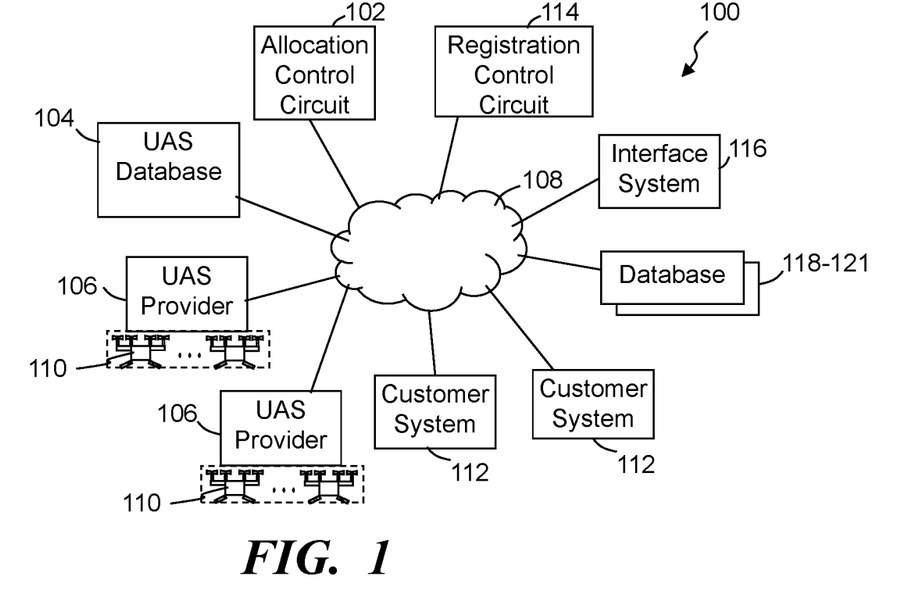
FIG. 1 illustrates a simplified block diagram of an UAS allocation system, in accordance with some embodiments.

FIG. 1 illustrates a simplified block diagram of an UAS allocation system 100, in accordance with some embodiments. The UAS allocation system includes at least one allocation control circuit 102, at least one UAS database 104, and a plurality of entity user interface devices (e.g., computer, tablet, smart phone or other such smart device, etc.) each associated with one of multiple different UAS providers 106. The allocation control circuit 102, UAS database 104 and plurality of UAS providers are in communication via a distributed communication and/or computer network 108, such as but not limited to a wide area network (WAN), local area network (LAN), the Internet, cellular network, other such communication networks, or a combination of two or more of such networks.

Each of the different UAS providers 106 has one or more UASs 110 that the UAS provider typically has registered. The UAS allocation system 100 is accessible to multiple different and geographically distributed customer systems 112, each associated with one of multiple geographically distributed and unassociated customers. The customers utilize the customer systems to access the UAS allocation system and at least submit a task request. Some embodiments further include an interface system 116 and/or the allocation control circuit 102 includes an interface system 116. The UAS allocation system may further include and/or components of the UAS allocation system may have access to one or more additional databases, such as a task database 118, customer database 119, UAS provider database 120, and/or other such databases 121.

The different UAS providers 106 register each of their one or more UASs 110 with the UAS allocation system 100. Further, the UAS providers agree with the UAS allocation system, through the registration of each of their UAS, to allow the one or more UASs to be operated to perform tasks for one or more customers of the UAS allocation system. Typically, the customer requesting the UAS task pays a fee to UAS provider and/or the UAS allocation system provider in response for the performance of the task by the UAS. In some instances, the UAS provider further pays a fee, percentage of amount paid by the customer, or other arrangement to the UAS allocation system provider to register UASs and/or for each task performed by a UAS that was allocated by the UAS allocation system to the UAS provider.

The customers utilize their customer systems 112 to access the UAS allocation system to at least in part submit task requests. The customer systems communicatively couple with the UAS allocation system through the distributed communication network 108 or other communication network. Further, the customer systems can be substantially any relevant device allowing the customer to submit a request, such as but not limited to computers, tablets, smart phones or other such smart devices, or other such devices.

The UAS allocation system 100 is configured to allocate and/or assign UASs having the capabilities to perform one or more tasks requested by customers. The UAS database 104 stores identifier information for each of multiple registered different UASs owned and operated by the multiple different unassociated UAS providers 106. The UAS providers register their UASs with the UAS allocation system identifying the capabilities of each UAS. The capabilities can correspond to specific tasks that are to be performed and/or functionalities of the UASs. For example, the capabilities can include, but are not limited to, one or more of whether the UAS includes a camera, a video camera, a resolution capabilities of a camera, a size of a UAS, weight of UAS, dimensions of UAS, a maximum flight speed, continuous flight duration capability, lift capacity, altitude limits, range of wireless control, lighting capabilities, wireless communication capabilities, wireless communication bandwidth capabilities, memory capacity, types of onboard sensors, sensor precision information, other such capabilities. The UAS database stores, for each of the registered different UASs, an identifier and corresponding operational capabilities. Some of the UAS may have similar or the same capabilities (e.g., particularly when the UASs are the same model and/or similar models), while many of the registered different UASs have different operational capabilities.

Figure 2:
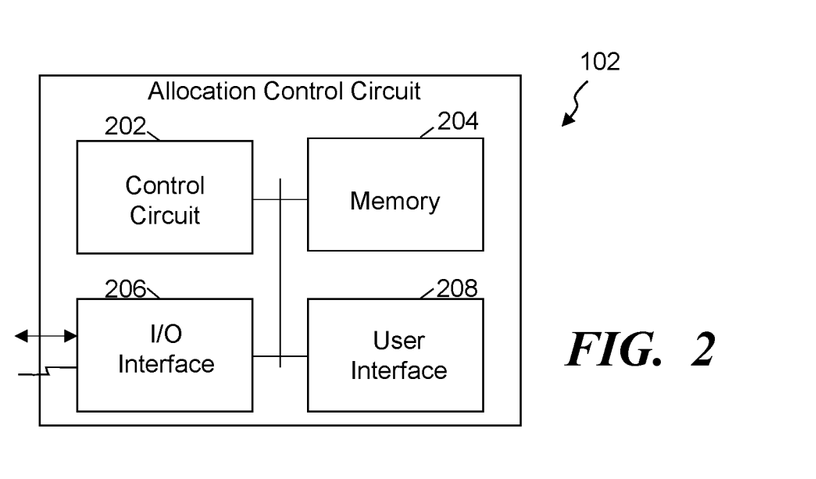
FIG. 2 illustrates a simplified block diagram of an exemplary allocation control circuit, in accordance with some embodiments.

FIG. 2 illustrates a simplified block diagram of an exemplary allocation control circuit 102, in accordance with some embodiments. The allocation control circuit 102 includes one or more control circuit 202, memory 204, and input/output (I/O) interfaces and/or devices 206. Some embodiments further include one or more user interfaces 208. The control circuit 202 typically comprises one or more processors and/or microprocessors. The memory 204 stores the operational code or set of instructions that is executed by the control circuit 202 and/or processor to implement the functionality of the allocation control circuit 102. In some embodiments, the memory 204 may also store some or all of particular data that may be needed to select UASs appropriate for a task, assign a task to a UAS, receive task information, register customers, register UAS providers, register UASs, track task performance and/or completion, compile UAS provider information, maintain records and/or ratings information on UAS providers and/or customers, distribute task information to UAS providers, and make other associations, determinations, measurements and/or communications described herein. Such data may be pre-stored in the memory 204, received from an external source, be determined, and/or communicated to the allocation control circuit.

It is understood that the control circuit 202 and/or processor may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Although the memory 204 is shown as internal to the allocation control circuit 102, the memory 204 can be internal, external or a combination of internal and external memory. While FIG. 2 illustrates the various components being coupled together via a bus, it is understood that the various components may actually be coupled to the control circuit 202 and/or one or more other components directly.

Further, the control circuit 202 and/or electronic components of the allocation control circuit 102 can comprise fixed-purpose hard-wired platforms or can comprise a partially or wholly programmable platform. These architectural options are well known and understood in the art and require no further description here. The allocation control circuit and/or control circuit 202 can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the allocation control circuit 102 to external components, such as customer systems 112, UAS databases 104, other databases 118-121, the interface system 116, registration control circuit 114, and other such devices or systems. Typically, the I/O interface 206 provides wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some implementations, the allocation control circuit includes one or more user interfaces 208 that may be used for user input and/or output display. For example, the user interface 208 may include any known input devices, such one or more buttons, knobs, selectors, switches, keys, touch input surfaces, audio input, and/or displays, etc. Additionally, the user interface 208 include one or more output display devices, such as lights, visual indicators, display screens, etc. to convey information to a user/worker, such as but not limited to requested tasks, task parameters, customer information, customer account information, customer history data, UAS information, UAS provider information, UAS provider account information, UAS provider history data, video content, image content, scans, other UAS provided data, status information, communication information (e.g., text messages, emails, etc.), mapping information, operating status information, notifications, errors, conditions, and/or other such information. Similarly, the user interface 208 in some embodiments may include audio systems that can receive audio commands or requests verbally issued by a worker, and/or output audio content, alerts and the like.

The allocation control circuit 102 couples with and/or includes some or all of the UAS database. Further, the allocation control circuit includes and/or couples with memory 204 storing computer instructions that can be executed by the allocation control circuit. The UAS allocation system receives requests from customers for tasks that the customers are requesting a UAS be allocated to perform. For each request, the allocation control circuit obtains a set of multiple task parameters corresponding to the request. The task parameters are typically specified by a customer submitting the request and/or determined based on a predefined task requested by the customer. The task parameters, in some instances, may be predefined for a specific predefined task, while in many instances, the parameters corresponding to tasks may vary based on the specific task being performed. Some embodiments provide predefined tasks (e.g., delivering a package, capturing video of a geographic area, a building, etc., counting a number of items, obtaining sensor measurements at a location). The parameters specified by customers and associated with these predefined tasks, however, typically vary for each requested task. For example, parameters may include, but are not limited to, one or more of a location where the task is to be performed, a duration the task is to be performed, image quality of video to be captured, a particular item or items of interest at a location to be captured by video, and numerous other such parameters. In some instances, for example, the set of task parameters define a location where the predefined task is to be performed and functions to be performed by the UAS in completing the predefined task. Each predefined task may have a predefined set of available parameter options, fields or the like that a customer can request, specify, select from, and the like. The customers specify the parameters corresponding to implementing the requested task.

The UAS database is evaluated relative to the set of task parameters and one or more UASs can be identified that have operational capabilities to perform the set of task parameters while implementing the first task. The task parameters typically specify a location where the UAS is needed to perform the task. Further, the operational capabilities may include a current location of the UAS, a distance the UAS provider is willing to transport the UAS to perform one or more tasks, costs associated with transporting the UAS, additional costs that a UAS is willing to receive to transport the UAS and perform the task beyond one or more threshold distances, and/or other such factors. In some implementations, UAS capabilities may include pilot capabilities corresponding to a skill set of one or more pilots available to operate a corresponding UAS. Accordingly, some UASs may not be identified as a relevant UAS to perform a task because a skill set of a pilot does not correspond to task parameters to be performed. The identification of a UAS can be determined based on the correlation of the operational capabilities relative to the task parameters. Further, in some instances the correlation is evaluated to determine whether operational capabilities of a UAS are within one or more threshold levels of correlation with the set of task parameters. Thresholds may be defined for each task parameter and/or each operational capability, a total threshold based on a statistical correlation of the task parameters, one or more thresholds for a collection of task parameters and/or operational capabilities, and/or other such thresholds. Weightings to one or more task parameters may be applied that can have an effect on selecting one or more UASs over other potential UAS that may also have the capabilities to perform the task. The weighting may be user specified (e.g., by identifying an importance of the parameter, the order of entry of parameters, type of task being requested, etc.), and/or the system may identify the weighting (e.g., based on UAS availability, UAS provider ratings, historical performance, etc.). The allocation control circuit further causes an allocation notification to be communicated to at least one of the UAS providers, of the multiple UAS providers, that are associated with the identified one or more UAS that have been identified as having operational capabilities that are within a threshold level of correlation with the set of task parameters.

The allocation notification identifies the receiving UAS provide the correlated UAS, and requests that the UAS provider allocate the identified UAS to implement the task. Further, the allocation control circuit is further configured to cause the set of task parameters corresponding to the task requested by the customer and for which the UAS was selected to be communicated to the UAS provider. In some instances, the task parameters can be included in the allocation notification. Additionally or alternatively, the UAS provider may access a UAS provider interface and/or account information that is associated with that UAS provider, and can obtain the task parameters from the interface. For example, the UAS allocation system 100 may establish UAS provider accounts for each registered UAS provider, which may be accessed via the Internet by the corresponding UAS provider. Through this account, the UAS provider can see what tasks have been allocated to them, and obtain the task parameters specific to that allocated task.

Further, in some embodiments, at least some of the UAS providers are responsible for controlling their UAS to perform the tasks allocated to those UAS providers. Accordingly, the set of task parameters can be provided to the appropriate UAS provider (e.g., in the allocation notification, accessed through the UAS provider account, etc.). The set of task parameters are intended to be utilized by the respective UAS provider in controlling the UAS in implementing the predefined task that has been allocated to that UAS provider in accordance with the set of task parameters.

An interface system 116 may be included in some embodiments that communicates with at least a plurality of the geographically distributed and unassociated customers through their respective customer systems 112. The interface system, at least in part, distributes user interface information over the network to the customer systems. The customer systems populate request user interfaces based on the user interface information. In some instances, for example, the interface system communicates a web page comprising a user interface with one or more options and/or fields with which the customer can interact. The web page is displayed by the customer system allowing the customer to interact with the user interface. Additionally or alternatively, the interface system may communicate user interface information that is utilized by an application (e.g., a mobile application (APP) and a mobile customer system (e.g., smart phone, tablet, etc.)). The application can utilize the user interface information to provide options, fields, and the like in a graphical user interface displayed through the customer system. The user interface information typically enables the display of a request user interface that includes options (e.g., virtual buttons, virtual toggle switches, pull-down menus, links, etc.) and fields (e.g., alphanumeric fields into which customers can enter alphanumeric characters), and/or other such inputs. Customers use the request user interface to enter task requests and specify the task parameters corresponding to the requested task. In some instances, different user interfaces may be provided for different predefined tasks, and/or a hierarchy of user interfaces may be provided to simplify the selection of one of multiple predefined tasks, and allow the customer to provide more focused task parameters depending on the selected predefined task and task parameters selected in previous user interfaces of the hierarchy. Accordingly, in some implementations the user interface information is configured to populate one or more request user interface, corresponding to at least one of multiple different predefined tasks for which at least one of the registered UASs are capable of performing.

Some embodiments may further limit the user interface information that is available and/or limit the tasks that can be selected based on knowledge of what UASs are available, which UASs are allocated, schedules of allocation, information in the UAS database, and the like. For example, a customer may specify a period of time when a UAS is desired, and the allocation control circuit may identify (e.g., from the UAS database and/or a UAS schedule) a UAS allocation schedule, and other information, that some UASs are not available (e.g., out of service, assigned to other tasks during that time). Based on the available UASs, the user interface information may be limited to tasks that can be performed by those available UASs. Similarly, a customer may not have sufficient clearance and/or legal authority to have a UAS perform a task. The allocation control circuit can identify which tasks cannot be performed and/or which can be performed. The user interface system can then limit the user interface information based on the tasks that cannot be performed, and/or that can be performed.

Figure 3:
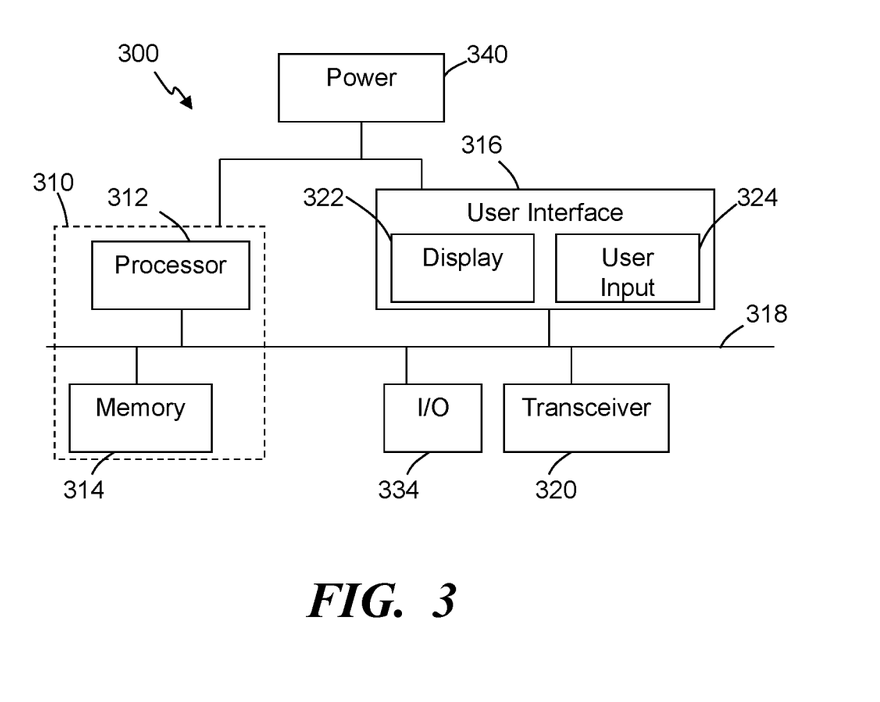
FIG. 3 illustrates an exemplary system for use in implementing methods, techniques, devices, apparatuses, systems, servers, sources and the like in loading and/or unloading products in accordance with some embodiments.

Further, the processes, methods, techniques, circuits, circuitry, systems, devices, functionality, services, servers, sources and the like described herein may be utilized, implemented and/or run on many different types of devices and/or systems. Referring to FIG. 3, there is illustrated an exemplary system 300 that may be used for any such implementations, in accordance with some embodiments. One or more components of the system 300 may be used for implementing any circuit, circuitry, system, functionality, apparatus, process, or device mentioned above or below, or parts of such circuit, circuitry, functionality, systems, apparatuses, processes, or devices, such as for example any of the above or below mentioned allocation control circuit 102, registration control circuit 114, interface system 116, customer system 112, UAS provider system 106, and/or other such circuitry, functionality and/or devices. However, the use of the system 300 or any portion thereof is certainly not required.

By way of example, the system 300 may comprise a controller circuit or processor module 310, memory 314, and one or more communication links, paths, buses or the like 318. Some embodiments may include one or more user interfaces 316, and/or one or more power sources or supplies 340. The controller circuit 312 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller circuit 312 can be part of control circuitry and/or a control system 310, which may be implemented through one or more processors with access to one or more memory 314, which can store code that is implemented by the controller circuit and/or processors to implement intended functionality. In some applications, the controller circuit and/or memory may be distributed over a communications network (e.g., LAN, WAN, Internet) providing distributed and/or redundant processing and functionality. Again, the system 300 may be used to implement one or more of the above or below, or parts of, circuits, systems, process and the like. For example, the system may implement the registration control circuit 114 with the controller circuit implementing a registration control circuit that implements computer instructions stored in memory 314. As another example, the system may implement the interface system 116 with the controller circuit implementing an interface control circuit that implements computer instructions stored in memory 314.

The user interface 316 can allow a user to interact with the system 300 and receive information through the system. In some instances, the user interface 316 includes a display 322 and/or one or more user inputs 324, such as a buttons, touch screen, track ball, keyboard, mouse, etc., which can be part of or wired or wirelessly coupled with the system 300. Typically, the system 300 further includes one or more communication interfaces, ports, transceivers 320 and the like allowing the system 300 to communicate over a communication bus, a distributed communication network (e.g., a local network, the Internet, WAN, etc.), communication link 318, other networks or communication channels with other devices and/or other such communications or combinations thereof. Further the transceiver 320 can be configured for wired, wireless, optical, fiber optical cable, satellite, or other such communication configurations or combinations of two or more of such communications. Some embodiments include one or more input/output (I/O) ports 334 that allow one or more devices to couple with the system 300. The I/O ports can be substantially any relevant port or combinations of ports, such as but not limited to USB, Ethernet, or other such ports.

The system 300 comprises an example of a control and/or processor-based system with the controller circuit 312. Again, the controller circuit 312 can be implemented through one or more processors, controllers, central processing units, logic, software and the like. Further, in some implementations the controller circuit 312 may provide multiprocessor functionality.

The memory 314, which can be accessed by the controller circuit 312, typically includes one or more processor readable and/or computer readable media accessed by at least the controller circuit 312, and can include volatile and/or non-volatile media, such as RAM, ROM, EEPROM, flash memory and/or other memory technology. Further, the memory 314 is shown as internal to the system 310; however, the memory 314 can be internal, external or a combination of internal and external memory. Similarly, some or all of the memory 314 can be internal, external or a combination of internal and external memory of the controller circuit 312. The external memory can be substantially any relevant memory such as, but not limited to, one or more of flash memory secure digital (SD) card, universal serial bus (USB) stick or drive, other memory cards, hard drive and other such memory or combinations of such memory. The memory 314 can store code, software, executables, scripts, data, content, lists, programming, programs, log or history data, user information and the like. While FIG. 3 illustrates the various components being coupled together via a bus, it is understood that the various components may actually be coupled to the controller circuit and/or one or more other components directly.

In some embodiments, the system 300 implements an exemplary interface system 116. The interface system 116 can include one or more interface control circuits, memory, and input/output (I/O) interfaces and/or devices. The interface control circuit typically comprises one or more processors and/or microprocessors. The memory stores the operational code or set of instructions that is executed by the interface control circuit and/or processor to implement the functionality of the interface system. In some embodiments, the memory may also store some or all of particular data that may be needed to distribute user interface information, obtain the relevant information provided by at least customers in specifying tasks to be performed, and make other associations, determinations, measurements and/or communications described herein. Such data may be pre-stored in the memory, received from an external source (e.g., UAS database 104, other database, etc.), be determined, and/or communicated to the interface system.

The I/O interface 334 allows wired and/or wireless communication coupling of to external components, such as customer systems 112, UAS databases 104, customer databases 113, other databases, the allocation control circuit 102, registration control circuit 114, interface system 116, and other such devices or systems. Typically, the I/O interface provides wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system 300 implements an exemplary registration control circuit 114. The registration control circuit 114 can include one or more registration control circuits, memory, and input/output (I/O) interfaces and/or devices. The registration control circuit typically comprises one or more processors and/or microprocessors. The memory stores the operational code or set of instructions that is executed by the registration control circuit and/or processor to implement the functionality of the interface system. In some embodiments, the memory may also store some or all of particular data that may be needed to register UASs, UAS providers, tasks, customers, obtain the relevant information, and make other associations, determinations, measurements and/or communications described herein. Such data may be pre-stored in the memory, received from an external source (e.g., UAS database 104, other database, etc.), be determined, and/or communicated to the interface system. Some embodiments the registration control circuit 114 is implemented through the allocation control circuit 102.

In some applications, the registration control circuit is configured to register UASs that UAS providers agree to be allocated to perform one or more tasks submitted by customers in exchange for a monetary compensation, discounts and/or credits at one or more retail stores and/or from one or more services, and/or other such compensation. Further, the registration control circuit may further register UAS providers as providers and/or operators of UASs. The registration process typically includes obtaining information about each UAS that a UAS provider is offering to allow to be allocated to perform tasks. Typically, the registration control circuit populates the UAS database with the relevant UAS information, including capabilities of the UASs.

In some embodiments, the registration control circuit obtains an identifier of each of the multiple different UASs that the UAS providers are authorizing to be allocated to implement one or more tasks requested by one or more of the plurality of different customers. Again, the customers are typically unassociated with the UAS providers. In obtaining the identifiers of the UASs, the registration control circuit may receive the identifier from the customer (e.g., a serial number of the UAS, a name or number specified by the provider, etc.), may generate a unique identifier (e.g., using a combination of information such as a serial number of a UAS and a provider identifier, a sequence of alphanumeric characters, or the like), received from the UAS allocation circuit, received from a UAS manufacturer, or other source or combination of such sources. Typically, the identifier is recorded in the UAS database 104. Further, the registration control circuit obtains the operational capabilities of each of the multiple different UASs. In some implementations, the registration control circuit may distribute and/or provide access to registration interface information configured to populate a UAS registration user interface that includes options (e.g., virtual buttons, virtual toggle switches, pull-down menus, links, etc.) and fields (e.g., alphanumeric fields into which customers can enter alphanumeric characters), and/or other such inputs that allow UAS providers to at least specify the capabilities of each UAS. In some instances, the registration user interface may further provide options to associate the UAS with the UAS provider, and/or the registration control circuit and/or allocation control circuit may have an identity of the UAS provider through a separate UAS provider registration and/or log-in. In some embodiments, for example, the registration control circuit may provide access to a web page and/or distribution registration interface information to be used by one or more applications at the UAS provider computer and/or mobile device systems to allow the UAS provider to define the capabilities of the UAS being registered.

The UAS registration user interface can include predefined fields and/or options corresponding to specific capabilities (e.g., size, weight, lift capacity, etc.) and/or options to select from predefined capabilities. Additionally or alternatively, the UAS provider may provide manufacturer identifying information about a UAS (e.g., serial number, make, model, manufacturer, and/or other such information), and the UAS may access the UAS database to retrieve predefined capabilities and/or access other information from manufacturers and/or other sources that specify the capabilities of the UAS. This information may be linked in the UAS database and/or stored in the UAS database. In some instances, one or more fields, options or the like may be customizable based in modifications and/or customizations a UAS provider may have made to the UAS and/or for when a UAS is independently built by the UAS provider and/or commissioned to be built by the UAS provider according to specific parameters. For example, the UAS provider may have need in performing its own business for one or more UASs to have specific functionalities. However, if the one or more specifically designed UASs are underutilized by the UAS provider, the UAS provider may register the UAS to allow it to be allocated by the UAS allocation system to perform tasks for other as a way of generating additional revenue for otherwise idle UASs. Some or all of the UAS capabilities specified by the UAS provider and/or obtained by the registration control circuit can in some implementations correspond to at least one of multiple different predefined tasks for which at least one of the registered UASs are capable of performing.

Using the received information, the registration control circuit can register each of the multiple different UASs. The registration, in part, typically includes storing, in the UAS database, each identifier of the multiple different UASs, and storing in relation to a corresponding one of the UAS identifiers the operational capabilities of each of the multiple different UASs. In some embodiments, the registration control circuit 114 associates each of the multiple different UASs with one or more predefined tasks. This association between UASs and predefined tasks can be determined based on a relationship between the operational capabilities specified and/or obtained for each of the multiple different UASs and sets of predefined task parameters that are associated with performing one or more predefined tasks. In some instances, the registration control circuit further associates each of the multiple different UASs with at least one of the predefined tasks based on a relationship between operational capabilities of each of the multiple different UASs and sets of predefined task parameters that are associated with sets of task parameters to be received from different customers submitting a task request. The predefined task parameters may have been specified by an operator and/or worker of the UAS allocation system 100, specified by a UAS provider in defining one or more tasks that one or more UASs the UAS provider is/has registered can perform, received from different customers in submitting a request for an allocation of a UAS, and/or other such sources.

Similarly, UAS providers may specify a task that the UAS provider believes one or more UASs are capable of performing. This identification by the UAS providers may be in response to the UAS provider registering a UAS. For example, the registration user interface may provide options to allow a UAS provider to sort through different tasks (e.g., a hierarchically organized categories of tasks) and select one or more tasks from one or more different listing of tasks that the UAS provider believes they can perform using the UAS. The listing of tasks may further identify the task parameters associated with the task to allow the UAS provider to evaluate the task parameters relative to the capabilities of the UAS with which the UAS provider is considering associating with the task and/or the UAS pilot's capabilities and/or skill level. In some instances, the registration control circuit and/or the allocation control circuit may perform a verification of a selection by a UAS provider of tasks the UAS provider believes that the registered UAS can perform. This verification may be based on the relationships between the UAS capabilities and the task parameters. For example, one or more of the UAS capabilities may have to be within corresponding thresholds of one or more task parameters to be a verified UAS to perform the associated task.

In some embodiments, the registration control circuit 114 and/or the allocation control circuit 102 may further register tasks for which a UAS provider is willing to allocate a UAS. In some applications, the registration control circuit receives a request from a UAS provider to define a task that the UAS provider is authorizing a UAS to perform. One or more sets of defined task parameters can further be received from the UAS provider that define parameters of the task with which the UAS provider is associating one or more UASs. The task can be register by, in part, storing a task identifier and the set of task parameters associated with the task identifier in a task database 118. Some embodiments allow customers to define tasks that they want performed, operators and/or workers of the UAS allocation system may define tasks and the corresponding task parameters, and/or third party sources may specify tasks and corresponding task parameters. Again, the task database can store task identifiers and corresponding task parameters for each task to allow customers to subsequently select that task as a task to be performed and/or UAS providers to select one or more of those tasks with which a UAS is to be associated.

Typically, the allocation control circuit and/or an operator and/or worker of the UAS allocation system 100 may set costs and/or rates to perform various tasks. These estimated costs may be provided to the customer during and/or after a customer submits a request to have a task performed. For example, the costs and/or rates may be specified through one or more of the customer user interfaces, and/or after a customer has selected a task and provided relevant task parameters. In some implementations, the registration control circuit may further receive from the UAS providers costs and/or rates to perform various tasks. The allocation control circuit may associate the cost to perform the task with the one or more UASs registered by the UAS provider that specifies the cost and/or rate. This cost and/or rate information may be provided to the customer through the user interface. For example, different pricing may be defined for different available UASs and/or UAS providers. The customer can then be provided with an option through the user interface to select a UAS and/or UAS provider to perform the requested task. Similarly, a rating of a UAS and/or a UAS provider may also be provided to the users through the user interface. Customers in selecting a UAS and/or UAS provider can further take into consideration the rating of the UAS and/or UAS provider. The rating can be customer ratings that are specified by previous customers that had tasks performed by the UAS and/or UAS provider. Similarly, the allocation control circuit and/or workers of the UAS allocation system may specify ratings information about a UAS and/or UAS provider (e.g., based on past performances, effectiveness relative to other UASs and/or UAS providers, complaints, requests for a provider, customers' willingness to wait for a UAS to be available from a particular UAS provider, and/or other such information). Similarly, customer ratings may be maintained. For example, UAS providers, UAS pilots and/or workers of the UAS allocation system may rate customers based on their payment history, cooperation with UAS providers, level of detail in specifying the tasks and/or parameters of tasks to be performed, and/or other such information. This customer rating may be provided to UAS providers in allowing UAS providers to decide whether to agree to allocation a UAS to perform a requested task and/or a cost or rate at which a UAS provider is willing to perform the task.

Figure 4:
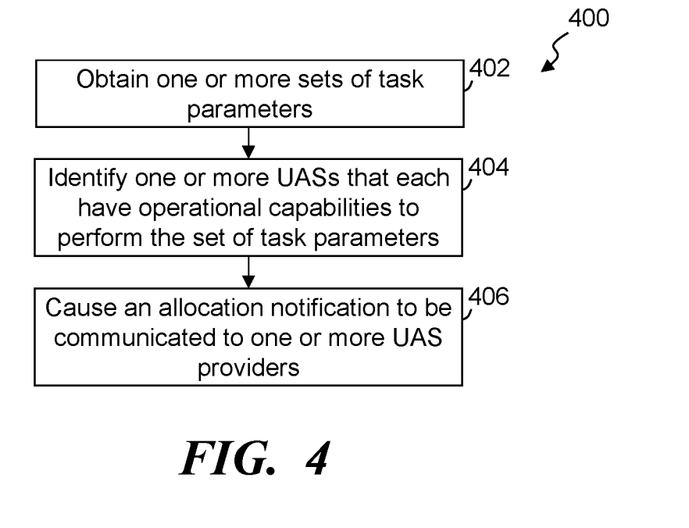
FIG. 4 illustrates a simplified flow diagram of an exemplary process of allocating UASs that have capabilities to perform tasks requested by customers, in accordance with some embodiments.

FIG. 4 illustrates a simplified flow diagram of an exemplary process 400 of allocating UASs that have capabilities to perform tasks requested by customers, in accordance with some embodiments. In some implementations, the process 400 is implemented for each requested task submitted by a customer. In step 402, a set of multiple task parameters are obtained, through the allocation control circuit 102, that are specified by a customer. The set of task parameters correspond to a requested task that the customer is requesting a UAS be allocated to perform. Typically, the task is a predefined task. Further, one or more UASs typically have been identified as having capabilities to perform the task.

In some embodiments, a plurality of geographically distributed and unassociated customers are provided with access to user interface information and/or the interface system 116. The interface system can distribute user interface information over the distributed communication network 108 to a plurality of geographically distributed and unassociated customers (e.g., to the customer systems 112). The user interface information populates, with respect to each of the plurality of customers, a request user interface corresponding to at least one of multiple different predefined tasks for which at least one of the registered UASs are capable of performing. Some embodiments, in distributing the user interface information, communicate the user interface information to customer computer systems associated with each of the plurality of customers. The user interface information populates, at each customer computer system, the request user interface comprising predefined fields to receive task parameters corresponding to one of the multiple predefined tasks. The allocation control circuit receives, from each of the plurality of customer computer systems through the request user interface, corresponding sets of task parameters to be performed by a UAS to complete a corresponding identified task.

In step 404, one or more UASs are identified, from the UAS database 104, that each have operational capabilities to perform the set of task parameters while implementing the task requested by the customer. Again, the UAS database 104 identifies multiple registered different UASs that are owned and operated by multiple different unassociated UAS providers. The UAS database typically further associates each registered UAS with corresponding operational capabilities. The operational capabilities may be specified by the UAS provider willing to perform tasks on behalf of customers, obtained from one or more other databases and/or third party sources (e.g., based on an identifier of a model, make, serial number, and/or other such information about a UAS), capabilities of other similar UASs specified in the UAS database 104, and/or other sources.

In step 406, the allocation control circuit causes an allocation notification to be communicated to a UAS provider, of the multiple UAS providers, associated with at least one UAS identified has having the capabilities to perform the requested task. The allocation notification typically notifies and/or requests that the UAS provider allocate the identified UAS to implement the customer requested task. In some implementations, the allocation control circuit causes a corresponding set of task parameters to be communicated to the UAS provider to be utilized by the UAS provider in controlling the UAS in implementing the predefined task in accordance with the set of task parameters. In some instances, the set of task parameters may be included in the allocation notification, while in other instances one or more subsequent communications may include the set of task parameters. Further, the set of task parameters typically define a location where the predefined task is to be performed and functions to be performed by the UAS in completing the predefined task.

Some embodiments further obtain an identifier of each of the multiple different UASs that one or more of the UAS providers are authorizing to be allocated to implement one or more tasks requested by a plurality of different customers who are unassociated with the UAS providers. The operational capabilities of each of the multiple different UASs are further obtained. Again, these capabilities may be provided by the UAS provider (e.g., through a UAS registration user interface, a UAS provider registration user interface, other such interfaces), from the UAS database based on a correlation between the UAS being registered and one or more previously registered UASs, a third party (e.g., a UAS manufacturer), and/or other source. Each of the multiple different UASs are registered. Typically, this registration includes storing in the UAS database each identifier of the multiple different UASs, and storing in relation to a corresponding one of the UAS identifiers the operational capabilities of the corresponding one of the multiple different UASs. In some implementations, each of the multiple different UASs is associated with at least one of the predefined tasks based on a relationship between operational capabilities of each of the multiple different UASs and sets of predefined task parameters that are associated with sets of task parameters to be received from different customers in submitting a request for an allocation of a UAS. Additionally or alternatively, a UAS provider may register and define a task with which a UAS is to be associated. A request can be received from a UAS provider to define a task that the UAS provider is authorizing a UAS to perform. A set of defined task parameters can be received that define characteristics of the task. The task can be registered comprising storing, in a task database, a task identifier and the set of task parameters associated with the task identifier. In some instances, the UAS provider may identify one or more other UASs, which may have been previously registered and/or that are subsequently registered, that can further perform the registered task. In some instances, one or more additional UAS providers may be notified of the added task, and provided an opportunity to identify one or more previously registered UASs associated with the UAS provider that should also be associated with the added task as a UAS that can perform the task.

Some embodiments enable customers to have a UAS allocated and/or to temporarily rent a UAS to perform a task from a UAS provider, which may be a company, collection of companies, individual, collection of individuals, or the like. In some instances, the available UASs may be limited to a threshold distance within an area where the task is to be performed. Further, the UASs available to perform the task are typically limited by the UAS and/or UAS pilot capabilities to perform the task and/or the task parameters. The allocation control circuit 102 can identify, based on a relationship between the task parameters and UAS capabilities, one or more UASs that can perform the task. In some instances, the UAS capabilities includes a location of the UAS, and the allocation control circuit may identify one or more closest UASs and/or closest UAS providers that are within an area where the task is to be performed by a UAS.

Many UASs that have capabilities to perform many tasks can be expensive and/or cost prohibitive for many individuals, companies and/or other such entities. Similarly, the operation of UASs can be difficult. Further, the flying of UASs typically includes complying with regulations (e.g., local, regional, state and/or federal regulations) of which many people do not know. Additionally, the use for a UAS is often not frequent enough for many people, companies and/or other entities to invest in a UAS and/or into a UAS sufficient to perform the desired task (e.g., a commercial type UAS). Accordingly, the UAS allocation system 100 allows customers (e.g., individuals, companies, or other such entities) to temporarily obtain use of a UAS that is owned by one or more other UAS providers. Further, the UAS allocation system often allocate UASs where the UAS provider supplies the UAS pilot/operator to control the UAS and/or program the UAS to implement the desired task.

Numerous different tasks can be performed through the allocation of the UASs. For example, the UASs may be allocated to perform aerial imagery, 3D scanning, package delivery, advertising (e.g., banners, audio/visual displays, etc.), lighting, topological surveys, inspection for insurance claims, RFID-based inventory, thermal imaging, object counting (e.g., determining number of cars in a parking lot, amount of traffic at an intersection, trees in a forest, etc.), monitoring lease, rental, or owned property, surveying crops, other such tasks, or a combination of two or more tasks.

Again, the UAS allocation system 100 enables UAS providers 106 (e.g., individuals, companies, collections of individuals, stores, clubs, other facilities, etc.) to register UASs and/or the availability to provide services to perform tasks. In some instances, the UAS provider registers each UAS. Additionally or alternatively, UAS providers may register tasks and/or services that can be performed by the UAS provider using one or more UASs at the UAS provider's disposal (e.g., that the UAS provider owns, can get access to, can build, or the like). In some applications, the UAS provider specifies capabilities information and/or data about the services and/or UAS capabilities. For example, the UAS provider may provide identity and/or registration data of one or more UASs, starting location of one or more UASs, distance the UAS provider is willing to travel with one or more UASs, costs associated with travel, and the like. The UAS capabilities can include specifying UAS types, technologies, specifications, etc. associate with the one or more UASs. Other capabilities and/or features of the UAS may include flight time, waterproofing, wind resistance, ability to hover versus being fixed wing, camera resolution, video capability resolution, ability to carry packages, payload, takeoff weight limits, and other such capabilities. In some instances, the UAS provider in providing capability information may further specify availability, scheduling, and the like of the UAS. Similarly, the UAS provider may specify an availability of pilots, videographers, and other support personnel that might be utilized in performing the task. This scheduling may be maintained over time by the UAS provider and/or the UAS allocation system. For example, the UAS allocation system can designate a UAS as being unavailable in response to allocating a UAS to perform a task. The capabilities information is used by the allocation control circuit 102 to match customers with UAS providers.

Further, in some instances, customers may request and/or register a task to be performed or otherwise apply for a UAS service. The customers enter task parameters, such as location where the task is to be performed, type of task, and the like. The location information can, in some instances, be used to identify relevant UASs, determine costs associated with performing a task, distinguish land boundaries with the use of local public records to account for property lines, and the like. Further, the location information can be used to comply with regulations (e.g., local, state, federal) and/or ensure that UASs will operate with their class of airspace. Typically, the customers in submitting a task request specify the task parameters. The parameters may include predefined parameters, and/or customer defined parameters. Examples of some task parameters includes, but is not limited to, distance, altitude, video, pictures, delivering payloads, and/or other such parameter information. In some instances, additional information may be provided (e.g., reason for the surveillance, person and/or object being surveyed, etc.). The customer may be provided with options to select desired technology to perform the task. In other instances, the UAS allocation system may determine relevant technology and/or a UAS provider may submit recommendations regarding the type of technology. Further, some applications allow a customer to request one or more UASs and/or UAS providers. In some embodiments, the UAS allocation system provides a user interface that allows customers to choose how they want to pay for the performance of the task. The payment may include options, such as full or partial prepay, post-pay (verification of assets), and the like. The UAS allocation system may further provide customers with an option to choose long term contractual engagement and payments terms.

The allocation control circuit 102 can evaluate the task parameters relative to provider and/or UAS capabilities to determine whether one or more UASs have capabilities within one or more relevant thresholds to be identified as potential UASs that can perform the task. For example, the allocation control circuit can determine whether there are one or more UASs within in threshold distance of a specified location/area, whether one or more UASs have relevant capabilities/technologies, and the like. Further, in some instances, the allocation control circuit evaluates the task location relative to flight regulations, no fly zones in that area, and/or other such factors. If the task location is in a no fly zone, the allocation control circuit, in some instances, may automatically notify the customer of this condition (e.g., via customer user interface through which the customer specified the task location, email, text message, instant message, automated voice, other such communication methods, or combination of such methods). In some embodiments, the allocation control circuit 102 and/or a bill system automatically bills and/or charges the customer for the service about to be performed, and/or upon completion of the task (e.g., in response to a notification from the UAS provider).

As described above, the allocation control circuit and/or a scheduling system of the UAS allocation system 100 maintains and/or tracks UAS work schedules. In some instances, the allocation of UASs can consider and/or provide route optimization to reduce costs, speed delivery, extend availability, etc. For example, multiple customers within neighboring communities may request services to be performed within similar time frames. The allocation control circuit may route a path allowing multiple services to be performed concurrently or in a single trip. The allocation control circuit 102 and/or a routing system of the UAS allocation system may attempt to determine a best method of getting a UAS to a task location (e.g., delivered by a vehicle or having the UAS fly itself to the location). The method may be dependent on the distance from the UAS's current location to the site as well as whether any no fly zones exist between the two locations. In other implementations, the UAS provider determines a way to get the UAS to the task location. Further, in some instances, the UAS allocation control circuit may coordinate the completion of a task between multiple different UASs and/or UAS providers. For example, for a large task or extended services, the allocation control circuit may coordinate between multiple UAS providers and/or UASs. Additionally or alternatively, the UAS provider may request that the allocation control circuit coordinate with one or more other UAS providers to complete a task, and may further allow a UAS provider to request one or more other UAS providers.

The UAS allocation system may, in some applications, further automatically create contingency and backup plans in the event of a UAS failure or UAS provider unavailability. The contingency can attempt to coordinate an alternate UAS and/or UAS provider. The UAS allocation control circuit may further notify the UAS provider associated with a UAS that has been selected as an alternate. In some instances, the notification as an alternate may be communicated similar to and/or at a similar time when the allocation notification is communicated to the UAS provider associated with the UAS selected to be allocated to perform the task. Further, the UAS allocation system can inform the customer of any delays via user interface, phone call, email, text, instant message, voice message, social media, other preferred method, or combination of two or more of such communication methods.

In some embodiments, the UAS allocation system may further track the progress of the performance of the task. For example, the UAS allocation system may notify the customer when a UAS is at the task location and/or has commenced the task. This notification may be in response to a UAS provider confirming commencement and/or based on communications from a UAS (e.g., GPS information, information being collected by the UAS in completing the task (e.g., photos, video, etc.), and/or other such information). Similarly, status information may be communicated during and/or upon completion of the task. These status reports may be communicated by text message, instant message, email, push notification/mobile application, or other such methods or combinations of such methods to the customer.

Further, in some embodiments, the UAS may send information being collected by the UAS in completing the task (e.g., still images, video, audio, count values, scans, and the like) to the UAS allocation system. For example, a UAS may stream video the UAS allocation system, which in some instances may in turn stream the video to a customer. In other applications, the UAS provider obtains the relevant information and subsequently communicates the information to the UAS allocation system and/or directly to the customer. In some instances, the information may not be available until the task is complete. When information is provided to the UAS allocation system, the UAS allocation system can communicate the information to the relevant customer and/or make the information available (e.g., through an on-line download, accessible and/or visible through a web site maintained by the UAS and/or a third party service, other such methods, or combination of two or more of such methods. The information may be maintained in a database, and organized for example according to a customer account. The information may be retained until the task is completed and/or for a threshold time after (e.g., based on fees paid, based on a customer's account level, etc.).

Some embodiments may further provide and/or otherwise make available unfilled task requests. These may be made publicly available, communicated to requesting entities, communicated to one or more registered UAS providers, other such publication, or combination of two or more of such publications. The reports may be used by prospective entrepreneurs to buy or build specific UASs with capabilities to be offered as a future service and/or to fulfill the pending and uncompleted task requests.

In some instances, the UAS allocation system may further include a support personnel database that identifies potential support personnel that may additionally or alternatively be allocated to perform the task. For example, a task may need a videographer, and a UAS provider may have a UAS available to perform a task, but may not have a videographer available. Accordingly, the UAS allocation system may select and notify a videographer from the support personnel database to support the UAS provider to complete the task that the UAS provider otherwise may not be able to perform. The allocation and/or notification of a support person may be in response to a UAS provider requesting an allocation of one or more support personnel.

In some embodiments, systems, apparatuses, methods, and processes are provided to enable the allocation of UASs. In some embodiments, an UAS allocation system is provided that comprises: a UAS database of multiple registered different UASs owned and operated by multiple different unassociated UAS providers, wherein the UAS database stores for each of the registered different UASs an identifier and corresponding operational capabilities, wherein multiple of the registered different UASs have different operational capabilities; an allocation control circuit coupled with the UAS database and memory storing computer instructions that when executed by the allocation control circuit cause the allocation control circuit to: obtain a first set of multiple task parameters specified by a first customer and corresponding to a requested first predefined task that the customer is requesting a UAS be allocated to perform; identify, from the UAS database, a first UAS having operational capabilities to perform the first set of task parameters while implementing the first task; and cause an allocation notification to be communicated to a first UAS provider, of the multiple UAS providers, associated with the first UAS requesting the first UAS provider to allocate the identified first UAS to implement the first task.

Further, some embodiments provide methods of allocating UASs, comprising: obtaining, through an allocation control circuit, a first set of multiple task parameters specified by a first customer and corresponding to a requested first predefined task that the customer is requesting a UAS be allocated to perform; identifying, from a UAS database of multiple registered different UASs owned and operated by multiple different unassociated UAS providers with each registered UAS having corresponding operational capabilities, a first UAS having operational capabilities to perform the first set of task parameters while implementing the first task; and causing an allocation notification to be communicated to a first UAS provider, of the multiple UAS providers, associated with the first UAS requesting the first UAS provider to allocate the identified first UAS to implement the first task.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An unmanned aircraft system (UAS) allocation system, comprising:
 a UAS database storing information corresponding to multiple registered different UASs, wherein the UAS database stores, for each of the multiple registered different UASs, corresponding operational capabilities, wherein a plurality of the multiple registered different UASs have different operational capabilities;
 a registration control circuit coupled with the UAS database and configured to obtain the operational capabilities of each of the multiple registered different UASs and register each of the multiple registered different UASs comprising storing, in the UAS database, the operational capabilities in association with a respective one of the multiple registered different UASs; and an allocation control circuit coupled with the UAS database and configured to allocate a respective one of the multiple registered different UASs, based on a respective threshold correlation between one or more of the respective operational capabilities and a corresponding one of a set of one or more task parameters, to implement at least part of a respective one of multiple requested tasks that are each received in association with a different one of a plurality of customers.

2. The system of claim 1, wherein the allocation control circuit is configured to:
obtain a first set of task parameters associated with a first customer, of the plurality of customers, and corresponding to a requested first task, of the multiple requested tasks, that is requested to be performed, on behalf of the first customer, by at least one of the multiple registered different UASs be allocated to perform;
identify a first UAS, of the multiple registered different UASs, having the respective threshold correlation between one or more of the first set of task parameters and corresponding one or more of a set of one or more of the operational capabilities; and
cause an allocation notification to be communicated, in response to the identification of the first UAS having the respective threshold correlation, to initiate implementation of the first task by the first UAS.

3. The system of claim 1, wherein a first task of the multiple requested tasks comprises a package delivery task; and
wherein the allocation control circuit, in allocating the respective one of the multiple registered different UASs, is configured to identify a first UAS, of the multiple registered different UASs, to perform the package delivery task based on a delivery payload task parameter relative to a lift capacity capability of the first UAS.

4. The system of claim 1, further comprising:
an interface system comprising an interface control circuit configured to:
communicate user interface information configured to populate at least a request user interface comprising predefined fields to receive one or more task parameters corresponding to a first requested task of the multiple requested tasks; and
receive, through the request user interface, the one or more task parameters corresponding to the first requested task to be performed by at least a first UAS of the multiple registered different UASs.

5. The system of claim 1, wherein the allocation control circuit is further configured to cause a first set of task parameters to be communicated that are to be applied in utilizing a first UAS, of the multiple registered different UASs, in implementing a first task in accordance with the first set of task parameters, wherein the first set of task parameters define functions to be performed by the first UAS in completing at least a portion of the first task.

6. The system of claim 1, wherein the registration control circuit is configured to obtain an identifier of each of the multiple registered different UASs to be allocated to implement one or more tasks; and
wherein the registration control circuit in registering each of the multiple registered different UASs stores, in the UAS database, each identifier of the multiple registered different UASs, and stores, in relation to a corresponding one of the identifiers, the operational capabilities of the corresponding one of the multiple registered different UASs.

7. The system of claim 1, wherein the registration control circuit is further configured to associate each of a set of UASs of the multiple registered different UASs with at least one of multiple predefined delivery tasks based on a relationship between the operational capabilities of each of the multiple registered different UASs and a corresponding set of one or more delivery task parameters.

8. The system of claim 1, wherein the registration control circuit is configured to:
associate a set of one or more UASs, of the multiple registered different UASs, that are authorized to perform a defined first task based on a first set of defined task parameters of the first task and corresponding capabilities of each of the set of one or more UASs.

9. The system of claim 8, wherein the registration control circuit is further configured to:
obtain an identifier UAS of the set of one or more UASs; and
obtain the operational capabilities of each of the UASs of the set of one or more UASs; and
wherein the registering each of the UASs of the set of one or more UASs comprising storing, in the UAS database, the corresponding UAS identifier of each UAS of the set of one or more UASs, and storing in relation to a corresponding one of the UAS identifiers the operational capabilities of a corresponding UAS of the set of one or more UASs.

10. The system of claim 1, wherein the allocation control circuit is further configured to coordinate a completion of a first task, of the multiple requested tasks, between two or more different UASs of the multiple registered different UASs.

11. A method of allocating unmanned aircraft systems (UAS), comprising:
maintaining a UAS database storing information corresponding to multiple registered different UASs, wherein the UAS database stores for each of the multiple registered different UASs, corresponding operational capabilities, wherein a plurality of the multiple registered different UASs have different operational capabilities;
obtaining the operational capabilities of each of the multiple registered different UASs;
registering each of the multiple registered different UASs comprising storing, in the UAS database, the operational capabilities in association with a respective one of the multiple registered different UASs; and
directing an allocation of a respective one of the multiple registered different UASs, based on a respective threshold correlation between one or more of the respective operational capabilities and a corresponding one of a set of one or more task parameters, to implement at least part of a respective one of multiple requested tasks that are each received in association with a different one of a plurality of customers.

12. The method of claim 11, further comprising:
obtaining a first set of task parameters associated with a first customer, of the plurality of customers, and corresponding to a requested first task, of the multiple requested tasks, that is requested to be performed, on behalf of the first customer, by at least one of the multiple registered different UASs be allocated to perform; and identifying a first UAS, of the multiple registered different UASs, having the respective threshold correlation between one or more of the first set of task parameters and corresponding one or more of a set of one or more of the operational capabilities;

wherein the directing the allocation of the respective one of the multiple registered different UASs comprises causing an allocation notification to be communicated, in response to the identification of the first UAS having the respective threshold correlation, to initiate implementation of the first task by the first UAS.

13. The method of claim 11, wherein the allocating the respective one of the multiple registered different UASs comprises identifying a first UAS, of the multiple registered different UASs, to perform a package delivery task based on a delivery payload task parameter relative to a lift capacity capability of the first UAS.

14. The method of claim 11, further comprising:

communicating user interface information configured to populate at least a request user interface comprising predefined fields to receive one or more task parameters corresponding to a first requested task of the multiple requested tasks; and receiving, through the request user interface, the one or more task parameters corresponding to the first requested task to be performed by at least a first UAS of the multiple registered different UASs.

15. The method of claim 11, further comprising:

causing a first set of task parameters to be communicated that are to be applied in utilizing a first UAS, of the multiple registered different UASs, in implementing a first task in accordance with the first set of task parameters, wherein the first set of task parameters define functions to be performed by the first UAS in completing at least a portion of the first task.

16. The method of claim 11, further comprising:

obtaining an identifier of each of the multiple registered different UASs to be allocated to implement one or more tasks; and wherein the registering each of the multiple registered different UASs comprising storing, in the UAS database, each identifier of the multiple registered different UASs, and storing, in relation to a corresponding one of the identifiers, the operational capabilities of the corresponding one of the multiple registered different UASs.

17. The method of claim 11, further comprising:

associating each of a set of UASs of the multiple registered different UASs with at least one of multiple predefined delivery tasks based on a relationship between the operational capabilities of each of the multiple registered different UASs and a corresponding set of one or more delivery task parameters.

18. The method of claim 11, further comprising:

associating a set of one or more UASs, of the multiple registered different UASs, that are authorized to perform a defined first task based on a first set of defined task parameters of the first task and corresponding capabilities of each of the set of one or more UASs.

19. The method of claim 18, further comprising:

obtaining a UAS identifier of each UAS of the set of one or more UASs;

obtaining the operational capabilities of each of the UASs of the set of one or more UASs; and registering each of the UASs of the set of one or more UASs comprising storing, in the UAS database, the corresponding UAS identifier of each UAS of the set of one or more UASs, and storing, in relation to a corresponding one of the UAS identifiers, the operational capabilities of a corresponding UAS of the set of one or more UASs.

20. The method of claim 11, further comprising:

coordinating a completion of a first task, of the multiple requested tasks, between two or more different UASs of the multiple registered different UASs.

* * * * *